(No Model.)

A. PHILBURN & A. MOORS.
STOPPER FOR BOTTLES.

No. 394,294. Patented Dec. 11, 1888.

Witnesses.
E. J. Griswold
John Revell

INVENTORS.
Anthony Philburn.
and
Arthur Moors.

By their attorneys
Howson & Howson

United States Patent Office.

ANTHONY PHILBURN AND ARTHUR MOORS, OF ASHTON-UNDER-LYNE, COUNTY OF LANCASTER, ENGLAND.

STOPPER FOR BOTTLES.

SPECIFICATION forming part of Letters Patent No. 394,294, dated December 11, 1888.

Application filed July 3, 1888. Serial No. 278,981. (No model.) Patented in England February 2, 1887, No. 1,641.

*To all whom it may concern:*

Be it known that we, ANTHONY PHILBURN, of 132 Katherine Street, Ashton-under-Lyne, county of Lancaster, England, artist, and ARTHUR MOORS, of Church Inn Hurst, of the same place, innkeeper, have invented certain Improvements in Stoppering Bottles, (for which we have obtained a patent in Great Britain, No. 1,641, dated February 2, 1887,) of which the following is a specification.

The object of our invention is to construct a simple and economical device for stoppering bottles.

Figure 1:
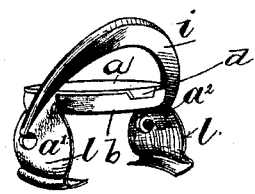
Figure 2:
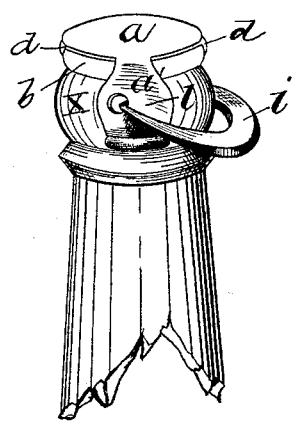
Figure 3:
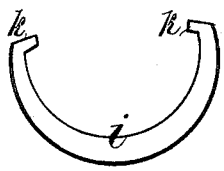

In the accompanying drawings, Figure 1 is a view of our improved stopper apart from the bottle. Fig. 2 is a view of the same applied to the bottle, and Fig. 3 is a separate view of the bridle or clip.

The stopper is composed of three parts, viz: the holder $a$ of thin sheet metal, the stopper-plug $b$, of cork, india-rubber, or other suitable material, and the bridle $i$. In manufacturing the stopper we take a thin sheet of brass, steel, iron, or other suitable metal, and stamp or punch out a flat blank to form the part $a$. The blank consists of a central circular portion, $a$, having projecting arms $a'$ $a^2$ on opposite sides of the blank, and also smaller projections, $d$. By a subsequent operation the arms $a'$ $a^2$ are bent into the shape shown in Figs. 1 and 2, the smaller projections, $d$, being also bent so as to form clinching-toes, whereby the cork or rubber plug is attached to the part $a$.

As will be seen from the drawings, the arms $a'$ $a^2$ are formed with a swell or curve, $l\ l$, and are pierced with holes to receive the pivots $k$ on the clip $i$, the said holes being placed to one side of the arms $a'$ $a^2$, so that they will be on the same side of a vertical plane passing through the center of the stopper, as more clearly seen in Fig. 2. The clip $i$ is of a curved form, and is a little more than a semicircle, and has inwardly-projecting pivots to enter the openings in the arms $a'$ $a^2$. The clip is of sufficient strength to impart the necessary pinching-pressure to the arms $a'$ $a^2$ when it is turned down. When the stopper is applied to the bottle, the clip $i$ is raised, as in Fig. 1, allowing the arms $a'$ $a^2$ to be slid over the part X of the bottle. The clip is then pushed downward into the position shown in Fig. 2, causing the clip $i$ to act upon the swells $l\ l$ on the arms $a'$ $a^2$ and pinch the two arms together against the top of the bottle-neck and hold the stopper securely in position.

We claim as our invention—

A bottle-stopper for the ordinary bottle, comprising a top having an attached disk or stopper, and a pair of curved or swelled spring-arms, in one side of which a bridle or clip is pivoted to embrace the spring-arms and cause them to grasp the bottle-neck and hold the stopper in position, substantially as described.

In testimony whereof we have signed our names to this specification in the presence of two subscribing witnesses.

A. PHILBURN.
ARTHUR MOORS.

Witnesses to the signature of A. Philburn:
DAVID FULTON,
FREDK. DILLON.

Witnesses to the signature of Arthur Moors:
D. H. VAUDREY,
FREDK. DILLON.